United States Patent
Nishi et al.

(10) Patent No.: US 10,310,486 B2
(45) Date of Patent: Jun. 4, 2019

(54) MANUFACTURING DATA PROCESSING SYSTEM HAVING A PLURALITY OF MANUFACTURING APPARATUSES

(71) Applicant: FANUC CORPORATION, Yamanashi (JP)

(72) Inventors: Hiroji Nishi, Yamanashi (JP); Shinsuke Sakakibara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 85 days.

(21) Appl. No.: 15/387,405

(22) Filed: Dec. 21, 2016

(65) Prior Publication Data
US 2017/0185068 A1 Jun. 29, 2017

(30) Foreign Application Priority Data
Dec. 28, 2015 (JP) .................. 2015-256921

(51) Int. Cl.
G06F 19/00 (2018.01)
G05B 19/408 (2006.01)
(Continued)

(52) U.S. Cl.
CPC ..... G05B 19/4083 (2013.01); G05B 19/4063 (2013.01); G05B 19/4185 (2013.01);
(Continued)

(58) Field of Classification Search
CPC .... G05B 19/41865; G05B 2219/32056; G05B 2219/33334; G06F 1/3209; G06F 1/3253;
(Continued)

(56) References Cited

U.S. PATENT DOCUMENTS

| | | | |
|---|---|---|---|
| 2008/0208361 A1* | 8/2008 | Grgic | G05B 19/41865 700/2 |
| 2012/0009883 A1* | 1/2012 | Shan | G06F 1/3209 455/67.11 |
| 2015/0316922 A1* | 11/2015 | Rischar | G05B 19/41855 700/23 |

FOREIGN PATENT DOCUMENTS

| | | |
|---|---|---|
| CN | 1823503 A | 8/2006 |
| CN | 105137928 A | 12/2015 |

(Continued)

*Primary Examiner* — Thomas C Lee
*Assistant Examiner* — Zhipeng Wang
(74) *Attorney, Agent, or Firm* — Hauptman Ham, LLP

(57) ABSTRACT

A manufacturing data processing system includes a plurality of manufacturing apparatuses, a plurality of data processing devices for processing manufacturing data associated with the plurality of manufacturing apparatuses, a plurality of communication channels for communicating the manufacturing data between the plurality of manufacturing apparatuses and the plurality of data processing devices, and a management device. The management device determines a combination of the data processing device that processes the manufacturing data associated with each of the plurality of manufacturing apparatuses and the communication channel that communicates the associated manufacturing data between each of the plurality of manufacturing apparatuses and the data processing device, based on the communication speed of the communication channel and the data processing capability of each of the plurality of data processing devices.

3 Claims, 9 Drawing Sheets

(51) Int. Cl.
*G05B 19/4063* (2006.01)
*G05B 19/418* (2006.01)

(52) U.S. Cl.
CPC ...... *G05B 19/41825* (2013.01); *G05B 19/408* (2013.01); *G05B 2219/33321* (2013.01); *Y02P 90/087* (2015.11); *Y02P 90/18* (2015.11); *Y02P 90/205* (2015.11)

(58) Field of Classification Search
CPC . G06F 9/505; H04L 67/1002; H04L 67/1008; H04L 67/1029; H04L 67/12; H04W 52/029; Y02D 10/151; Y02D 70/00; Y02P 90/86
See application file for complete search history.

(56) References Cited

FOREIGN PATENT DOCUMENTS

| | | |
|---|---|---|
| JP | 2005-5926 A | 1/2005 |
| JP | 2006-134203 A | 5/2006 |
| JP | 2011-77711 A | 4/2011 |
| JP | 2014-68110 A | 4/2014 |
| JP | 5816771 B1 | 11/2015 |
| WO | 2012/101890 A1 | 8/2012 |

\* cited by examiner

MANUFACTURING DATA PROCESSING SYSTEM HAVING A PLURALITY OF MANUFACTURING APPARATUSES

This application is a new U.S. patent application that claims benefit of JP 2015-256921 filed on Dec. 28, 2015, the content of 2015-256921 is incorporated herein by reference.

BACKGROUND OF THE INVENTION

1. Field of the Invention

The present invention relates to a manufacturing data processing system having a plurality of manufacturing apparatuses, and more specifically relates to a manufacturing data processing system that processes manufacturing data associated with a plurality of manufacturing apparatuses.

2. Description of Related Art

Machining apparatuses such as machine tools and manufacturing apparatuses such as robots have been used alone. Contrarily, production systems in which a plurality of manufacturing apparatuses are connected through communication channels to a host computer that makes a production plan are proposed. The host computer directs the type, number, and the like of products that each manufacturing apparatus is to manufacture. The manufacturing apparatuses each produce the directed number of directed products, thus allowing the production of desired products in desired delivery times with the efficient use of production resources. Such production systems include not only machining apparatuses such as machine tools or robots, but also manufacturing machines, control devices, sensors, and the like, such as PLCs, carrier machines, measuring instruments, testing machines, pressing machines, press fitting machines, printing machines, die-casting machines, injection molding machines, food machines, packaging machines, welding machines, washing machines, coating machines, assembling machines, mounting machines, wood working machines, sealing machines, and cutting machines. The apparatuses and devices included in the production systems are referred to as FA devices. In the following description, machine tools, robots, and sensors are used as the FA devices, but the present invention is not limited thereto.

The above production systems are required to collect, process, and memorize a large amount of manufacturing data associated with a plurality of FA devices, and to feedback processing results to the corresponding FA devices. Thus, the production systems have a data processing device for processing the manufacturing data, a memory device for storing the manufacturing data, and communication channels for communicating the manufacturing data between each FA device and the data processing device. Since the manufacturing data is stored in form of a database, the memory device may be hereinafter referred to as a database.

In recent years, machine learning using various types of real-time data generated by machine tools, robots, and various sensors is considered. For example, the machine learning may be used to determine the movement of an axis of the machine tool or the robot, or to make a failure diagnosis using a current value. This allows for the reduction of a load on operators and programmers, and also allows for easily achieving high quality, high efficiency, and the like, which have been achieved only by skilled operators and programmers.

Machine learning requires a database for storing data and a learning unit for analyzing the data. It is conventionally conceived that hardware resources such as a CPU, a memory, and an external storage device that constitute the database and the learning unit are provided in each of FA devices such as machine tools, robots, and various sensors, to perform learning in each FA device. However, providing the hardware resources in each FA device causes an increase in hardware costs. Therefore, a learning server having the database and the learning unit is provided and connected to the FA devices through a network. When performing learning, learning data is transmitted from the FA devices to the learning server through the network. In the learning server, the learning data is accumulated in the large database, and the learning unit performs learning. Learning results are transmitted from the learning server to the FA devices through the network. Such a system having the learning server has a similar configuration to the above production system in which, for example, the learning unit corresponds to the data processing device.

Furthermore, in the above production system, manufacturing data associated with many FA devices is so-called big data. The production system has a similar configuration to a cloud system in which big data is accumulated in a large database and processed by a server connected through a network.

Japanese Unexamined Patent Publication (Kokai) No. 2014-068110 describes communication devices connected to transmission channels and a switching control method. The plurality of transmission channels are provided between the communication devices. In the event that one of the transmission channels has a failure, the output of data is redirected to another of the transmission channels having no failure, to maintain data communication.

SUMMARY OF THE INVENTION

FA devices such as machine tools, robots, and various sensors generate an enormous amount of real-time data and continue generating the data as long as the machine tools, robots, and various sensors continue operating. Since processing the real-time data of several hundreds, thousands, or tens of thousands of the machine tools, the robots, and the various sensors requires an ultrafast network, an extremely large database, and an ultrahigh performance processor, such a system is very expensive.

Furthermore, the FA devices such as the machine tools, the robots, and the various sensors are not necessarily operated every day. A part of the machine tools and the robots may be required to be stopped for maintenance. Also, since the amount of data generated by each individual machine tool, robot, or sensor may fluctuate, it is necessary for the network, the database, and the processor to be able to process a maximum amount of communication data, thus causing very poor cost efficiency.

An object of the present invention is to provide a manufacturing data processing system that collects and processes manufacturing data associated with FA devices such as machine tools, robots, and various sensors.

More specifically, an object of the present invention is to provide a manufacturing data processing system that performs machine learning using real-time data generated by FA devices such as machine tools, robots, and various sensors as manufacturing data.

A manufacturing data processing system according to the present invention includes a plurality of manufacturing apparatuses, a plurality of data processing devices for processing manufacturing data associated with the plurality of manufacturing apparatuses, a plurality of communication channels for communicating the manufacturing data between the plurality of manufacturing apparatuses and the plurality of data processing devices, and a management device. The management device determines a combination of the data processing device that processes the manufacturing data associated with each of the plurality of manufacturing apparatuses and the communication channel that communicates the associated manufacturing data between each of the plurality of manufacturing apparatuses and the data processing device, based on the communication speed of the communication channel and the data processing capability of each of the plurality of data processing devices.

At least a part of the plurality of data processing devices may have a learning unit.

The manufacturing data processing system may further include a network management device for switching a connection between the plurality of communication channels.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

Before describing embodiments, an FA device, FA devices having a learning unit, and a conventional cloud type manufacturing data processing system having a learning unit will be described.

Figure 1:
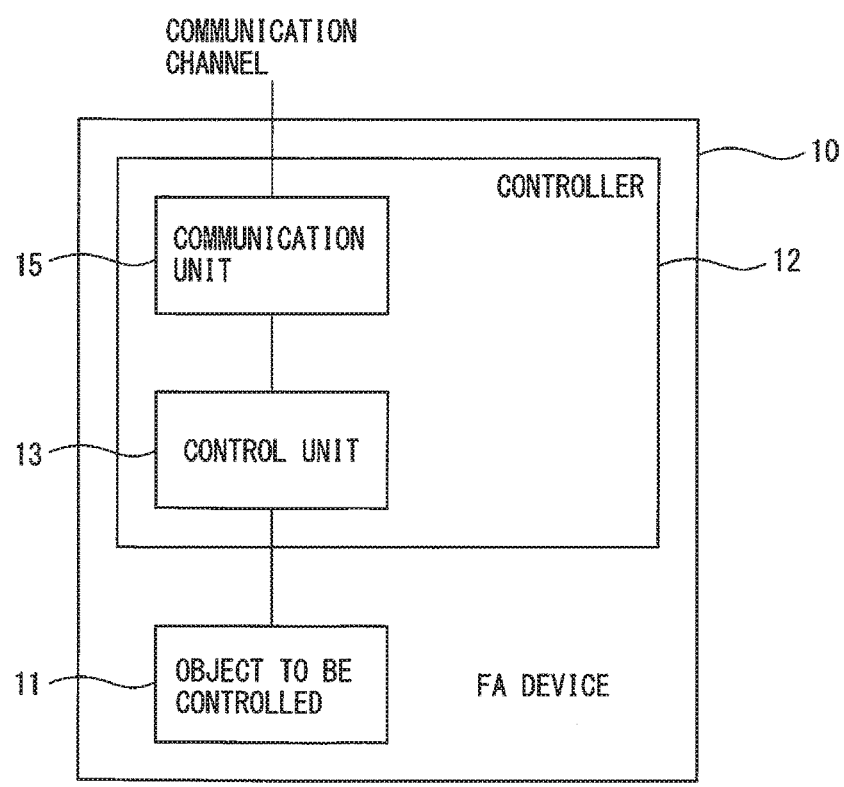
FIG. 1 is a block diagram showing an example of the configuration of an FA device.

FIG. 1 shows an example of the configuration of an FA device.

An FA device 10 includes an object to be controlled (or object to be detected) 11 and a controller 12. The controller 12 includes a control unit 13 and a communication unit 15, which is connected to communication channels. The control unit 13 is realized by software or firmware on a computer. The communication unit 15 is realized by a communication device or communication software. The control unit 13 communicates with a host computer and controllers of other FA devices through the communication channels, while controlling the object to be controlled 11.

As described above, the FA device is a machining apparatus such as a machine tool, or a manufacturing machine, a control device, a sensor, or the like such as a robot, a PLC, a carrier machine, a measuring instrument, a testing machine, a pressing machine, a press fitting machine, a printing machine, a die-casting machine, an injection molding machine, a food machine, a packaging machine, a welding machine, a washing machine, a coating machine, an assembling machine, a mounting machine, a wood working machine, a sealing machine, or a cutting machine. The object to be controlled (or object to be detected) 11 corresponds to a main body portion of the FA device.

Figure 2B:
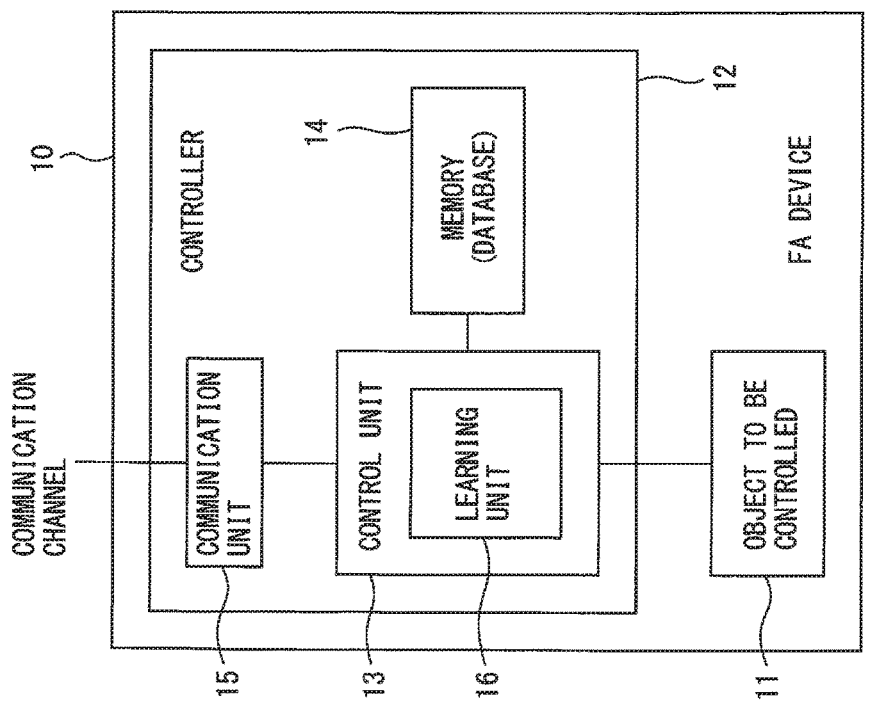
FIG. 2B is a block diagram of the configuration of the FA device having a learning function to which a computer is added as a learning unit.
Figure 2A:
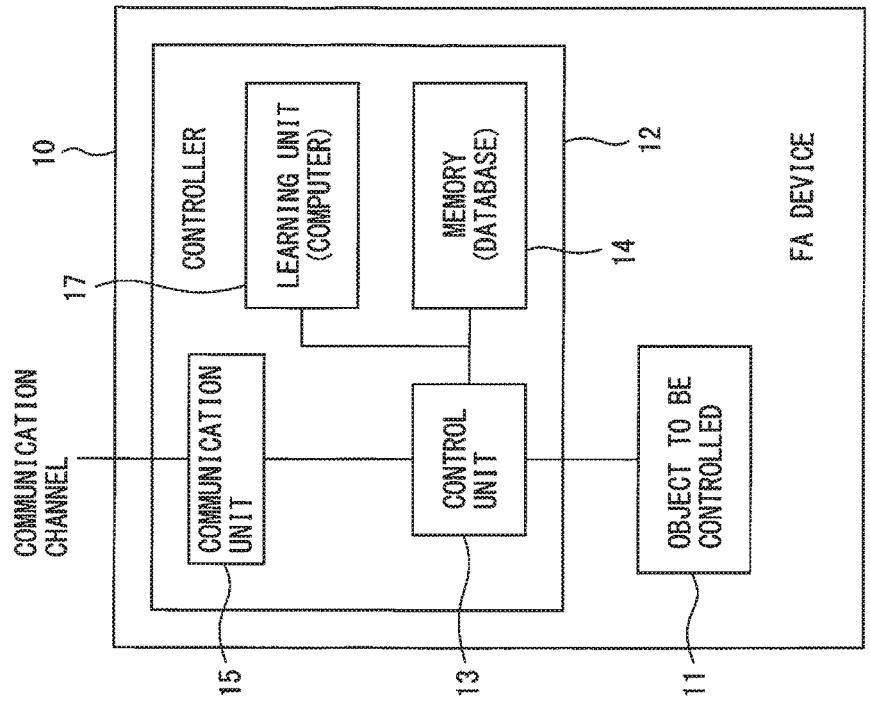
FIG. 2A is a block diagram of the configuration of the FA device having a learning function in which a learning unit is provided in a control unit.

FIG. 2A shows the configuration of an FA device having a learning function in which a learning unit is provided in the control unit. FIG. 2B shows the configuration of another FA device having a learning function to which a computer is added as a learning unit.

In the configuration of FIG. 2A, the controller 12 has a memory 14 to form a learning database, and the control unit 13 has a learning unit 16 therein, in addition to the configuration of FIG. 1. The learning unit 16 is realized by software of the computer that forms the control unit 13. The configuration of FIG. 2A is adoptable when the computer that forms the control unit 13 has an adequate processing capability for learning. However, the processing capability of the computer that forms the control unit 13 is generally inadequate for realizing the learning unit 16. Thus, the configuration of FIG. 2A may not be able to realize a learning unit having an adequate learning function.

Therefore, as shown in FIG. 2B, a computer is mounted in the controller 12 to realize a learning unit 17. However, this requires significant hardware resources by which the memory capacity of the database 14 and the computer processing capability of the learning unit 17 are obtained to achieve an adequate learning function, thus causing an increase in hardware costs.

Figure 3:
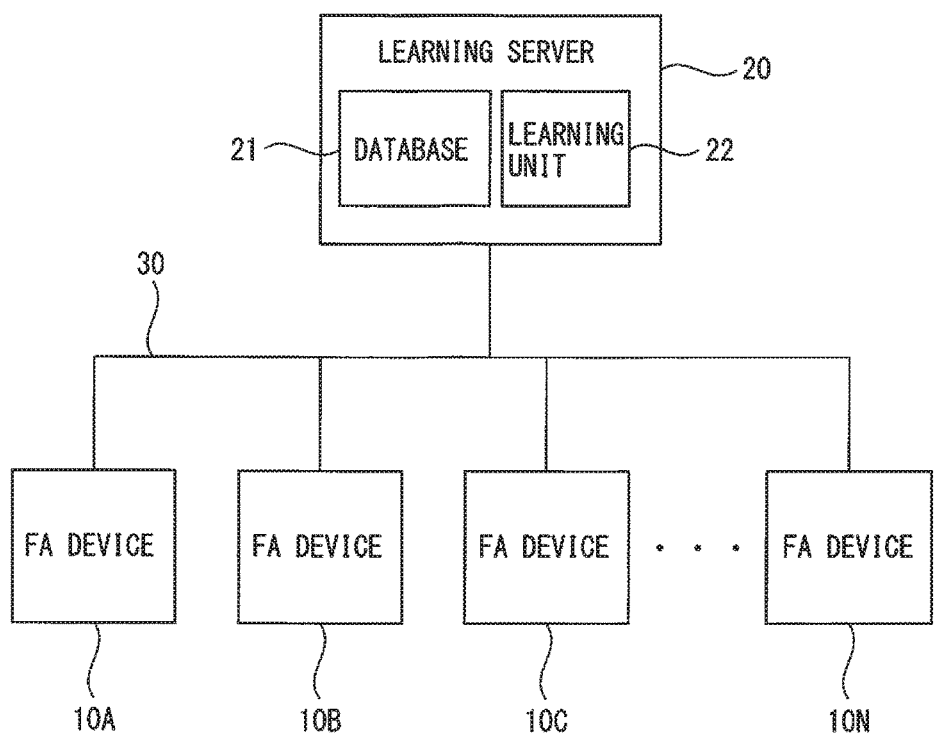
FIG. 3 is a block diagram showing an example of the configuration of a conventional manufacturing data processing system having a learning server that is shared among a plurality of FA devices.

FIG. 3 shows an example of the configuration of a conventional manufacturing data processing system having a learning server that is shared among a plurality of FA devices.

The manufacturing data processing system of FIG. 3 includes a plurality of FA devices (10A to 10N), a learning server 20 having a database 21 and a learning unit 22, and a communication network 30 provided among the plurality of FA devices (10A to 10N) and the learning server 20. The communication network 30 is, for example, a ring network such as a token ring network.

During learning, the plurality of FA devices (10A to 10N) transmit data to the learning server 20 through the network 30. In the learning server 20, the learning data is accumulated in the large database 21, and the learning unit 22 performs learning. Learning results are transmitted from the learning server 20 to the corresponding FA devices through the network 30.

Note that, the configuration of FIG. 3 is also applicable in the case of providing a management server that collects, analyzes, and manages the manufacturing data of the plurality of FA devices, as well as the learning server. In such a case, the management server is substituted for the learning server 20.

The FA devices such as machine tools, robots, and various sensors generate an enormous amount of real-time data and continue generating the data as long as the machine tools, the robots, and the various sensors continue operating. When the number of the machine tools, the robots, and the various sensors is several hundreds, thousands, or tens of thousands, processing an enormous amount of real-time generated data requires an ultrafast network, an extremely large database, and an ultrahigh performance processor, thus requiring a very expensive system. A lack of the channel capacity of the network, the capacity of the database, or the processing capability of the processor causes a failure of desired processing (learning) with desired timing.

Also, in the configuration of FIG. 3, the amount of data generated by each individual machine tool, robot, or sensor may fluctuate. The network, the database, and the processor are required to be able to process a maximum amount of communication data, thus causing very poor cost efficiency. The following embodiments provide manufacturing data processing systems that process (learn) real-time data generated by FA devices such as machine tools, robots, and various sensors as manufacturing data at low costs.

Figure 4:
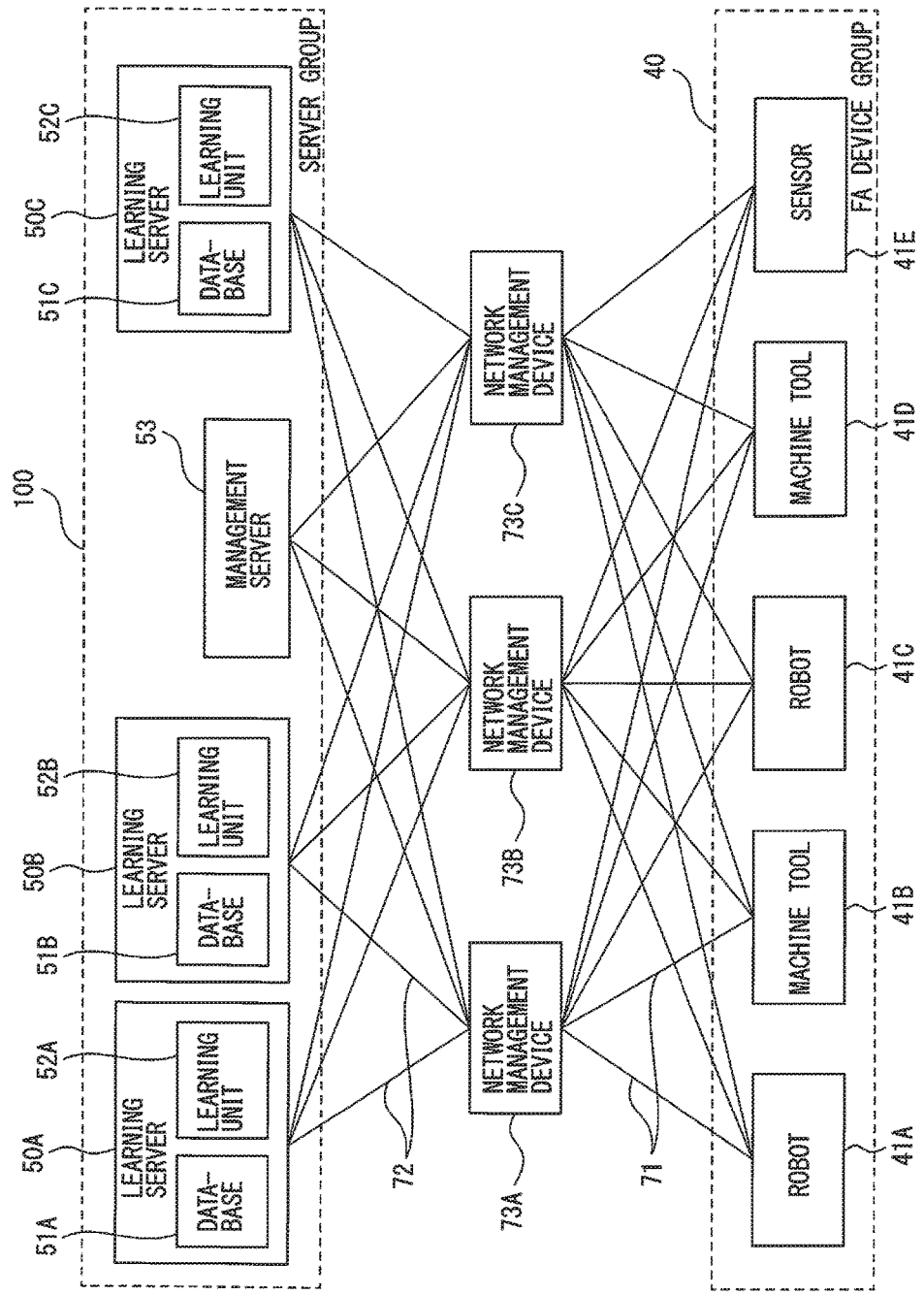
FIG. 4 is a block diagram showing the configuration of a manufacturing data processing system according to a first embodiment of the present invention.

FIG. 4 shows the configuration of a manufacturing data processing system according to a first embodiment of the present invention.

The manufacturing data processing system according to the first embodiment includes an FA device group 40, first communication channels 71, a plurality of network management devices 73A to 73C, second communication channels 72, and a server group 100.

In the drawing, the FA device group 40 has a robot 41A, a machine tool 41B, a robot 41C, a machine tool 41D, and a sensor 41E. The robot 41A, the machine tool 41B, the robot 41C, the machine tool 41D, and the sensor 41E each have the configuration as shown in FIG. 1. The object to be controlled 11 corresponds to a main body portion. The control unit 13 controls the main body portion. For example, in the robot 41A, the object to be controlled 11 is a main body portion of the robot, and the control unit 13 is a robot controller that controls the main body portion of the robot. The FA device group 40 may include any of the above-described manufacturing apparatuses, control devices, sensors, and the like, in addition to or instead of the machine tools, the robots, and the sensor.

The server group 100 includes learning servers 50A, 50B, and 50C and a management server 53. The learning servers 50A, 50B, and 50C include a database 51A, 51B, and 51C and a learning unit 52A, 52B, and 52C, respectively. The databases 51A to 51C have a configuration corresponding to the memory (database) 14, and the learning units 52A to 52C have a configuration corresponding to the learning unit (computer) 17 as shown in FIG. 2B. The management server 53 performs general management.

The learning servers 50A, 50B, and 50C perform learning for the control units of the robot 41A, the machine tool 41B, the robot 41C, the machine tool 41D, and the sensor 41E included in the FA device group 40. However, the learning servers 50A, 50B, and 50C may perform learning for the entire manufacturing data processing system such as assignments of tasks to the individual FA devices.

Although not illustrated, when the learning servers 50A, 50B, and 50C perform learning for the FA devices, the robot 41A, the machine tool 41B, the robot 41C, the machine tool 41D, and the sensor 41E included in the FA device group 40 may have a learning result execution unit such as a neural communication channel to execute a learning result.

The learning unit 52A to 52C may use any algorithm such as "supervised learning", "unsupervised learning", "semi-supervised learning", "reinforcement learning", "transduction", or "multi-task learning", and any technique such as "decision tree learning", "association-rule learning", "neural network", "genetic programming", "inductive logic programming", "support vector machine", "clustering", "Bayesian network", "reinforcement learning", or "expression learning".

In the first embodiment, the plurality of learning servers are provided anyway. Therefore, it is possible to reduce the storage capacity of a memory device forming the database 51A, 51B, or 51C and the processing capability of a processor forming the learning unit 52A, 52B, or 52C in each learning server relatively when compared with the system having a single learning server as shown in FIG. 3.

Each of the network management devices 73A to 73C is communicatably connected to the robot 41A, the machine tool 41B, the robot 41C, the machine tool 41D, and the sensor 41E included in the FA device group 40 through the first communication channels 71. Each of the network management devices 73A to 73C is communicatably connected to the learning servers 50A, 50B, and 50C and the management server 53 included in the server group 100 through the second communication channels 72, to control connections between the first communication channels 71 and the second communication channels 72. Each of the plurality of network management devices is connected to every FA device and every learning server. However, each of the plurality of network management devices may not be connected to every FA device and every learning server. Also, each of the plurality of FA devices and the plurality of learning servers is connected to every network management device. However, each of the plurality of FA devices and the plurality of learning servers may not be connected to every network management device. Furthermore, the network management devices 73A to 73C may be integrated into one network management device.

The first communication channels 71 and the second communication channels 72, which can be enabled or disabled in a free manner, form a relatively low-speed network.

Figure 5A:
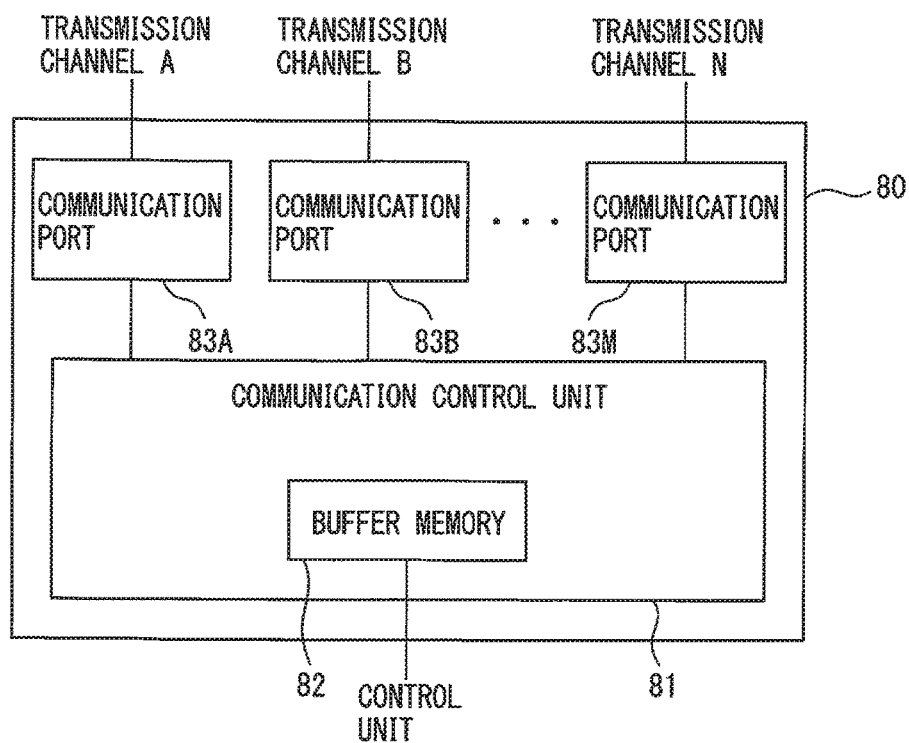
FIG. 5A is a block diagram showing an example of the configuration of a communicator.
Figure 5B:
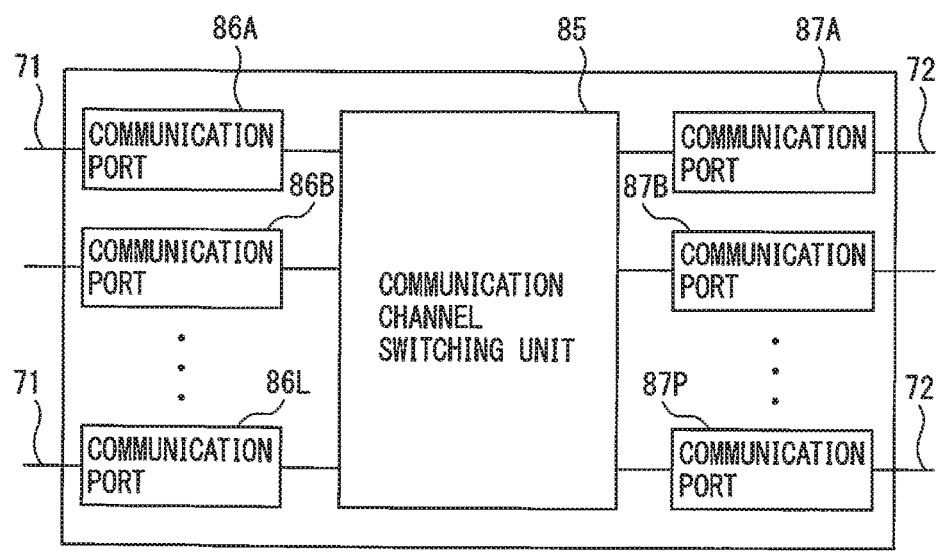
FIG. 5B is a block diagram showing an example of the configuration of another communicator.

FIG. 5A shows the configuration of a communicator provided in the FA devices 41A to 41E, the learning servers 50A to 50C, or the management server 53. FIG. 5B shows the configuration of a communicator provided in each of the network management devices 73A to 73C.

As shown in FIG. 5A, the communicator provided in the FA devices 41A to 41E, the learning servers 50A to 50C, or the management server 53 has communication ports 83A, 83B, ..., and 83M, the number of which is equal to the number of the connected first communication channels 71 or second communication channels 72, and a communication control unit 81. The communication control unit 81 has a buffer memory 82 that temporarily stores communication data. The communication control unit 81 transmits transmission data from the control unit to one of the communication ports 83A, 83B, ..., and 83M, and transmits reception data from the communication port 83A, 83B, ..., or 83M to the control unit.

As shown in FIG. 5B, each of the network management devices 73A to 73C has communication ports 86A, 86B, . . . , and 86L, the number of which is equal to the number of the connected first communication channels 71, communication ports 87A, 87B, . . . , and 87P, the number of which is equal to the number of the connected second communication channels 72, and a communication channel switching unit 85. The communication channel switching unit 85 switches the connection between the communication port 86A, 86B, . . . , or 86L and the communication port 87A, 87B, . . . , or 87P. The communication channel switching unit 85 may switch the connection between one of the communication ports 86A, 86B, . . . , and 86L and another one of the communication ports 86A, 86B, . . . , and 86L, and the connection between one of the communication ports 87A, 87B, . . . , and 87P and another one of the communication ports 87A, 87B, . . . , and 87P. This allows communication between the FA devices, between the learning servers, or between the learning server and the management server.

In the manufacturing data processing system according to the first embodiment, each of the FA devices 41A to 41E notifies the management server 53 of the generation speed (data size per second) of learning data, in response to a query from the management server 53. Each of the learning servers 50A to 50C notifies the management server 53 of the generation speed (data size per second) of learning data, in response to a query from the management server 53. Each of the network management devices 73A to 73C notifies the management server 53 of the generation speed (data size per second) of learning data, in response to a query from the management server 53. Based on these notifications, the management server 53 notifies each FA device to which learning server the FA device should transmit the learning data. The management server 53 notifies the network management devices 73A to 73C regarding which communication channels to enable and which communication channels to disable, and which FA device is connected to which learning server through the enabled communication channels. The management server 53 notifies the learning server, when the learning data transmitted from the FA device exceeds the processing capability of the learning server, to which learning server the learning server should transfer the learning data. As described above, the management server 53 determines combinations of the FA device, the communication channels (network management device), and the single or plurality of learning servers. When the generation speed of the learning data of each FA device, the communication speed of each communication channel, or the processing speed of the learning data of each learning server varies dynamically, the management server 53 may be arbitrarily notified of the dynamic variation and dynamically change the combination of the FA device, the communication channels (network management device), and the single or plurality of learning servers.

Figure 6:
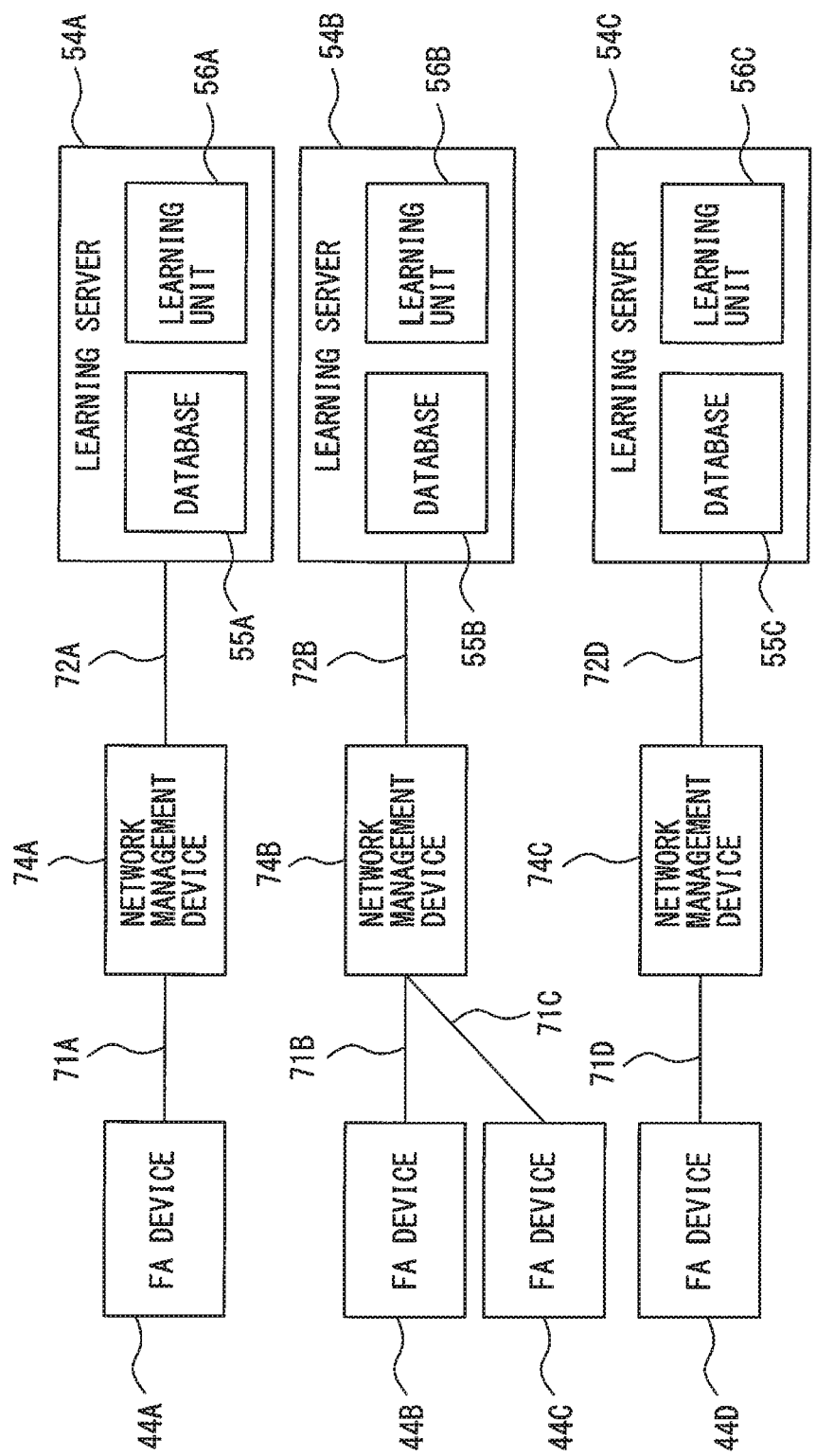
FIG. 6 is a block diagram showing an example of connections between an FA device group and a learning server group in the manufacturing data processing system according to the first embodiment.

FIG. 6 shows an example of connections between the FA device group and the learning server group in the manufacturing data processing system according to the first embodiment.

In the example of FIG. 6, an FA device 44A is connected to a learning server 54A having a database 55A and a learning unit 56A through a first communication channel 71A, a network management device 74A, and a second communication channel 72A. An FA device 44D is connected to a learning server 54C having a database 55C and a learning unit 56C through a first communication channel 71D, a network management device 74C, and a second communication channel 72D.

On the contrary, FA devices 44B and 44C are connected to a network management device 74B through first communication channels 71B and 71C, respectively, and the network management device 74B is connected to a learning server 54B having a database 55B and a learning unit 56B through a second communication channel 72B.

The example of FIG. 6 is suitable for processing learning data generated by the FA devices 44A and 44D in the learning servers 54A and 54C, respectively, and is realized when the learning server 54B has a sufficient processing capability to process learning data generated by the FA devices 44B and 44C. It is also required, as a matter of course, that each communication channel is able to transmit necessary data. For example, the second communication channel 72B has a high communication speed so as to be able to transmit the learning data generated in the FA devices 44B and 44C.

Figure 7A:
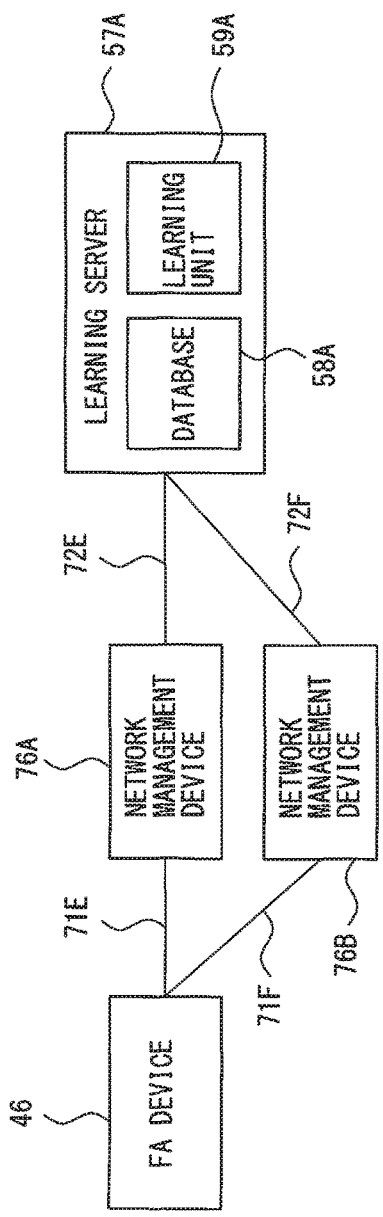
FIG. 7A is a block diagram showing another example of a connection between the FA device group and the learning server group in the manufacturing data processing system according to the first embodiment.
Figure 7B:
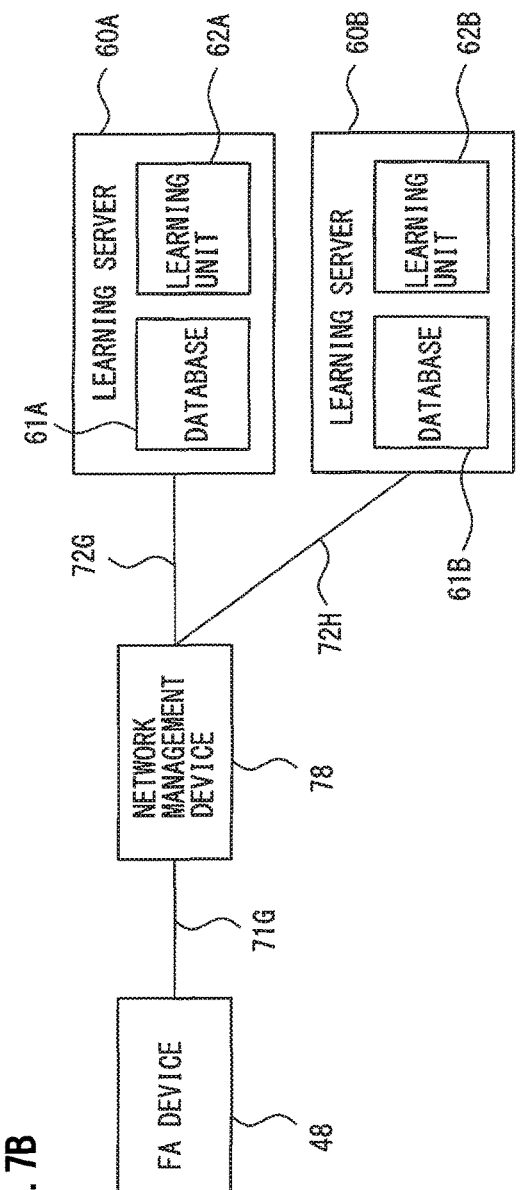
FIG. 7B is a block diagram showing yet another example of a connection between the FA device group and the learning server group in the manufacturing data processing system according to the first embodiment.

FIGS. 7A and 7B show other examples of connections between an FA device and a learning server or learning servers in the manufacturing data processing system according to the first embodiment.

In FIG. 7A, since an FA device 46 generates a large amount of learning data, the FA device 46 is connected to a learning server 57A having a high processing capability so as to process the large amount of learning data. However, one first communication channel and one second communication channel have an inadequate communication speed. Thus, the FA device 46 is connected to the learning server 57A through two first communication channels 71E and 71F, two network management devices 76A and 76B, and two second communication channels 72E and 72F.

In FIG. 7B, since an FA device 48 generates a large amount of learning data, the FA device 48 is connected to two learning servers 60A and 60B to process the large amount of learning data. A first communication channel 71G has an adequate communication speed to transmit the learning data generated by the FA device 48. A network management device 78 connects the first communication channel 71G to second communication channels 72G and 72H, in order to transmit the learning data to the learning servers 60A and 60B.

As described above, in the manufacturing data processing system according to the first embodiment, the management server 53 determines the combinations of the FA device, the first and second communication channels, the network management device, and the learning server based on the generation speed of the learning data of the FA device, the communication speed of the communication channels, free space in the database of the learning server, and the data processing capability of the learning unit. Therefore, there can be various connection examples other than the examples shown in FIGS. 6 and 7.

In the first embodiment, the management server determines the combinations of the FA device, the communication channels, the network management device, and the learning server group based on the generation speed of the learning data of each FA device. However, the management server may determine the combinations of the FA device, the communication channels, the network management device, and the learning server group based on the size of learning data the FA device has and the size of unprocessed learning data the database of the learning server has.

The FA devices, the learning servers, and the network management devices may autonomously notify the management server 53 of data without a query from the management server 53. Alternatively, the management server 53 may have information about data sizes in advance.

When the learning server performs machine learning not by a lamping analysis (butch processing) but by a stepwise analysis (real-time processing), it is possible to eliminate the need for providing the database in the learning server, and the learning unit may directly process learning data from the network through a buffer having a small capacity.

In this example, the first communication channels 71 and the second communication channels 72 form the relatively low-speed network that can be enabled or disabled in a free manner. However, a ring communication network such as a token ring network may be used instead. In this case, a plurality of ring communication networks is provided. The plurality of FA devices and the plurality of learning servers are each connected to the plurality of ring communication networks. A part of the ring communication networks are specific to communication between a certain one of the FA devices and a certain one of the learning servers. On the other hand, the remaining FA devices and learning servers are able to communicate through the remaining ring communication networks.

Figure 8:
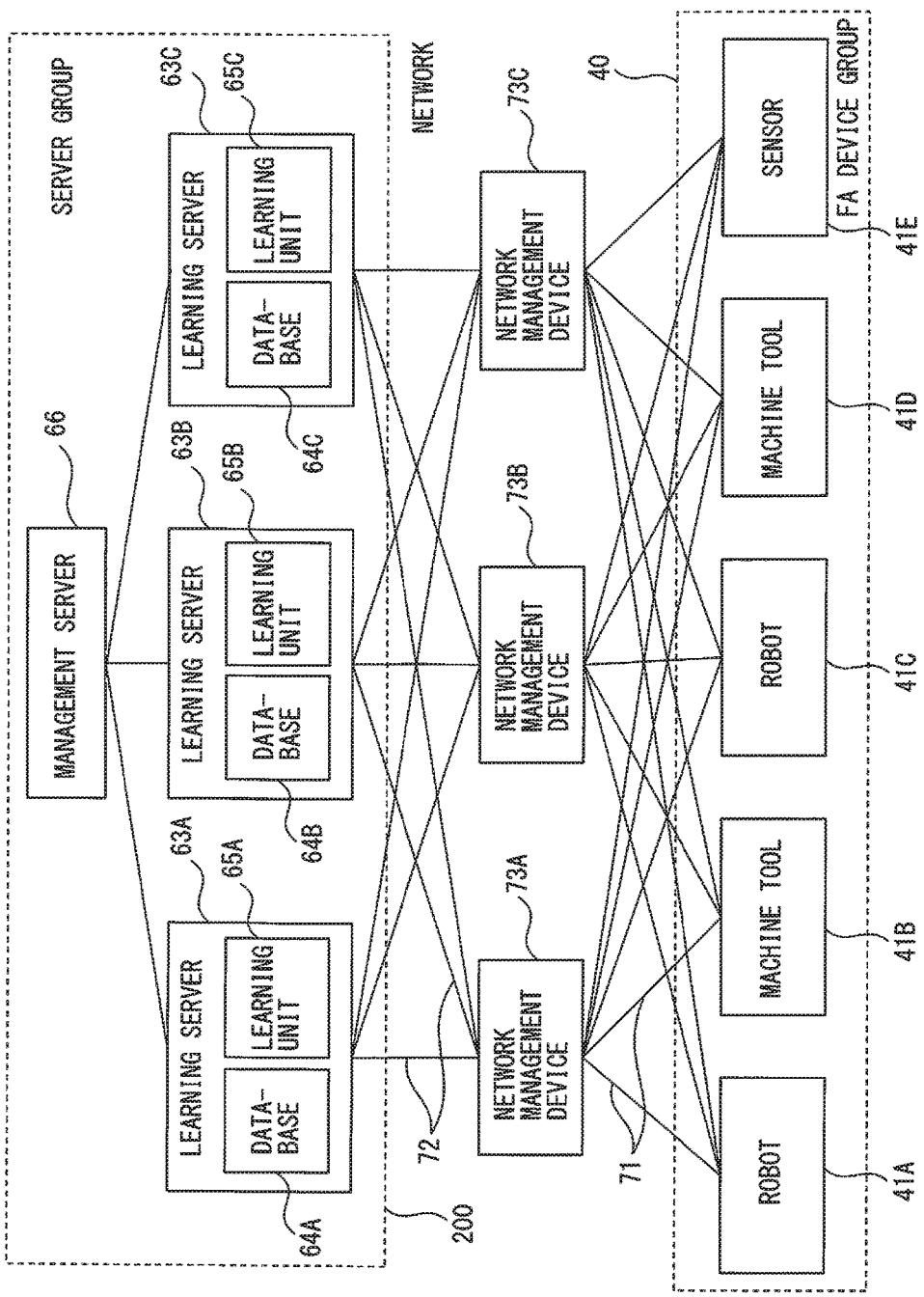
FIG. 8 is a block diagram showing the configuration of a manufacturing data processing system according to a second embodiment of the present invention.

FIG. 8 shows the configuration of a manufacturing data processing system according to a second embodiment of the present invention.

The difference between the manufacturing data processing system according to the second embodiment and the manufacturing data processing system according to the first embodiment is that a server group 200 has a management server 66 connected to learning servers 63A to 63C. The other configuration is the same as that of the first embodiment.

In the first embodiment, the management server is equal in level and position to the learning servers. On the contrary, in the second embodiment, the management server 66 is at a higher level than the learning servers 63A to 63C. The management server 66 communicates with each FA device included in the FA device group 40 through the learning server 63A, 63B, or 63C, the second communication channel 72, the network management device 73A, 73B, or 73C, and the first communication channel 71.

Figure 9:
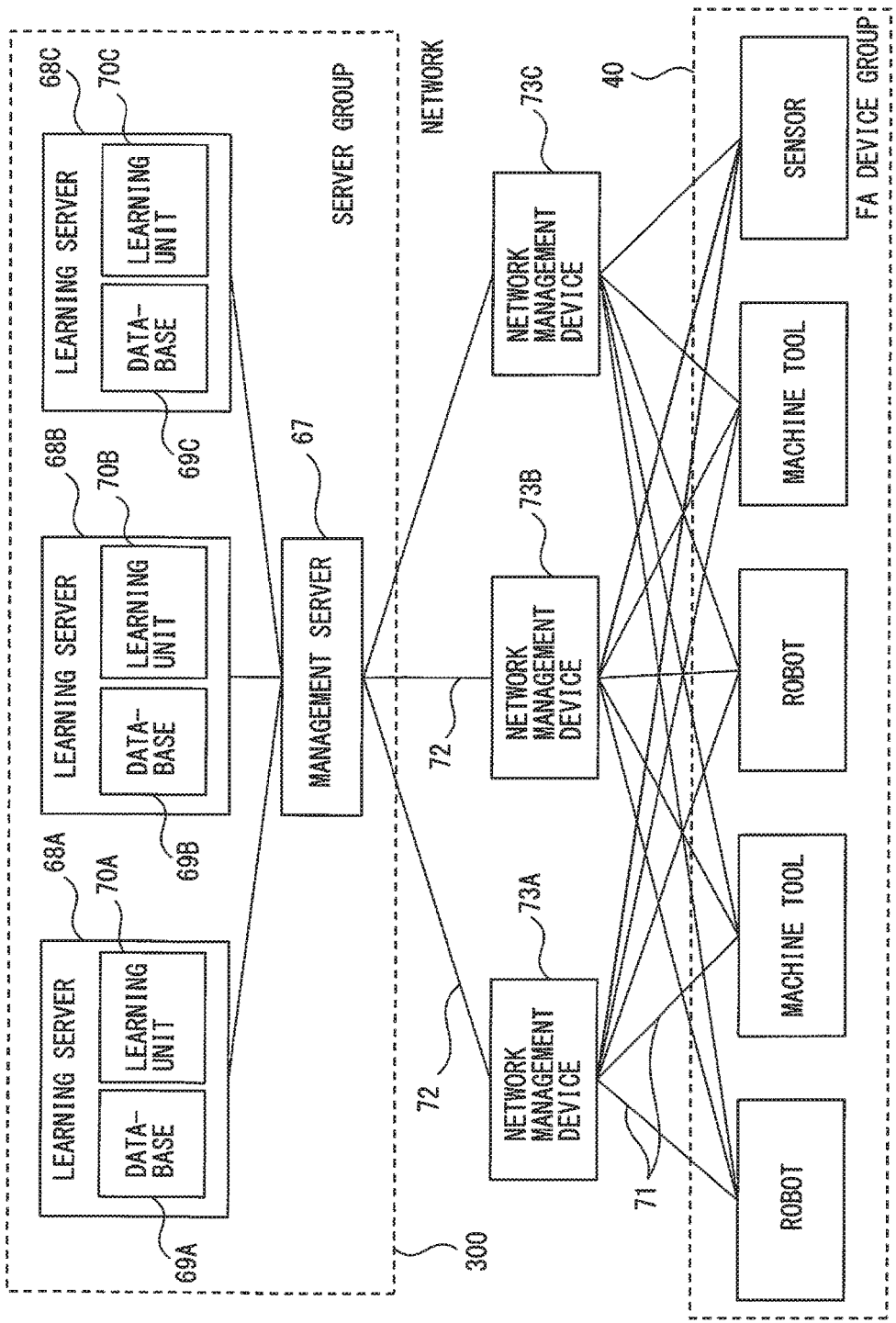
FIG. 9 is a block diagram showing the configuration of a manufacturing data processing system according to a third embodiment of the present invention.

FIG. 9 shows the configuration of a manufacturing data processing system according to a third embodiment of the present invention.

The difference between the manufacturing data processing system according to the third embodiment and the manufacturing data processing system according to the first embodiment is that a server group 300 has a management server 67 connected to the network management devices 73A to 73C through the second communication channels 72, and learning servers 68A to 68C are connected to the second communication channels 72 and the like through the management server 67. The other configuration is the same as that of the first embodiment.

In the third embodiment, the management server 67 is at a lower level than the learning servers 68A to 68C. The learning servers 68A to 68C communicate with each FA device included in the FA device group 40 through the management server 67, the second communication channel 72, the network management device 73A, 73B, or 73C, and the first communication channel 71.

In the above first to third embodiments, the server group has the learning servers. However, a manufacturing data analysis server may be provided instead of the learning server to analyze the manufacturing data of the FA devices included in the FA device group 40.

The present invention provides a distributed processing type manufacturing data processing system at a low cost.

What is claimed is:

1. A manufacturing data processing system comprising:
a plurality of manufacturing apparatuses;
a plurality of data processing devices configured to process manufacturing data associated with the plurality of manufacturing apparatuses;
a plurality of communication channels configured to communicate the manufacturing data between the plurality of manufacturing apparatuses and the plurality of data processing devices; and
a management device,
wherein
at least a part of the plurality of data processing devices has a learning unit and a database, and
the management device configured to determine a combination of (i) the data processing device that processes the manufacturing data associated with each of the plurality of manufacturing apparatuses and (ii) the communication channel that communicates the associated manufacturing data between each of the plurality of manufacturing apparatuses and the data processing device, based on
generation speed of learning data generated by the plurality of manufacturing apparatuses,
communication speed of the communication channel,
free space in the database, and
the data processing capability of the learning unit of each of said at least part of the plurality of data processing devices, and
the management device is configured to control each of the plurality of manufacturing apparatuses to connect to the determined combination of (i) the data processing device and (ii) the communication channel.

2. The manufacturing data processing system according to claim 1, further comprising a network management device for switching a connection between the plurality of communication channels.

3. The manufacturing data processing system according to claim 1, wherein
the database is configured to store the learning data generated by the plurality of manufacturing apparatuses, and
the learning unit is configured to process and perform machine learning based on the learning data generated by the plurality of manufacturing apparatuses and stored in the database.

* * * * *